United States Patent [19]

Smith

[11] 4,337,923
[45] Jul. 6, 1982

[54] FIBRE OPTICAL CABLE PULLING EYE

[76] Inventor: Jackson A. Smith, Box 1058, Aldergrove, B.C., Canada, U0X-1A0

[21] Appl. No.: 190,016

[22] Filed: Sep. 23, 1980

[51] Int. Cl.³ .............................................. B65H 59/00
[52] U.S. Cl. .............................. 254/134.3 FT; 174/79; 403/285; 403/362
[58] Field of Search ............... 254/134.3 FT, 134.3 R; 350/96.23; 174/79; 403/285, 281, 362, 215, 274, 275, 284; 15/104.3 SN, 104.3 R, 104.3 G; 294/82 R

[56] References Cited

U.S. PATENT DOCUMENTS

| | | | |
|---|---|---|---|
| 2,267,630 | 12/1941 | Weiland | 403/215 X |
| 2,901,725 | 8/1959 | Schuyler | 403/215 X |
| 3,166,810 | 1/1965 | Ensley | 254/134.3 FT X |
| 3,551,959 | 1/1971 | Mastalski | 174/79 X |
| 3,573,346 | 4/1971 | Appleby | 174/79 X |
| 3,769,685 | 11/1973 | Noda | 403/274 |
| 3,857,645 | 12/1974 | Klein | 403/215 X |
| 3,989,400 | 11/1976 | Smith et al. | 403/275 |
| 4,002,817 | 1/1977 | De Grado | 254/134.3 R X |

Primary Examiner—Robert C. Watson
Attorney, Agent, or Firm—Cushman, Darby & Cushman

[57] ABSTRACT

A device for attachment to fibre optic cable for pulling such cable through trunking systems or the like, includes a tubular body for receiving an end of the cable and adapted for crimping around the cable. A head portion of the device, in alignment with the tubular portion, includes apparatus for locking a central strength member of the cable into the device. In a preferred embodiment the locking apparatus consists of a plurality of set screws spaced throughout the length of the head portion and serving to crimp and secure the strength member to the pulling device.

1 Claim, 6 Drawing Figures

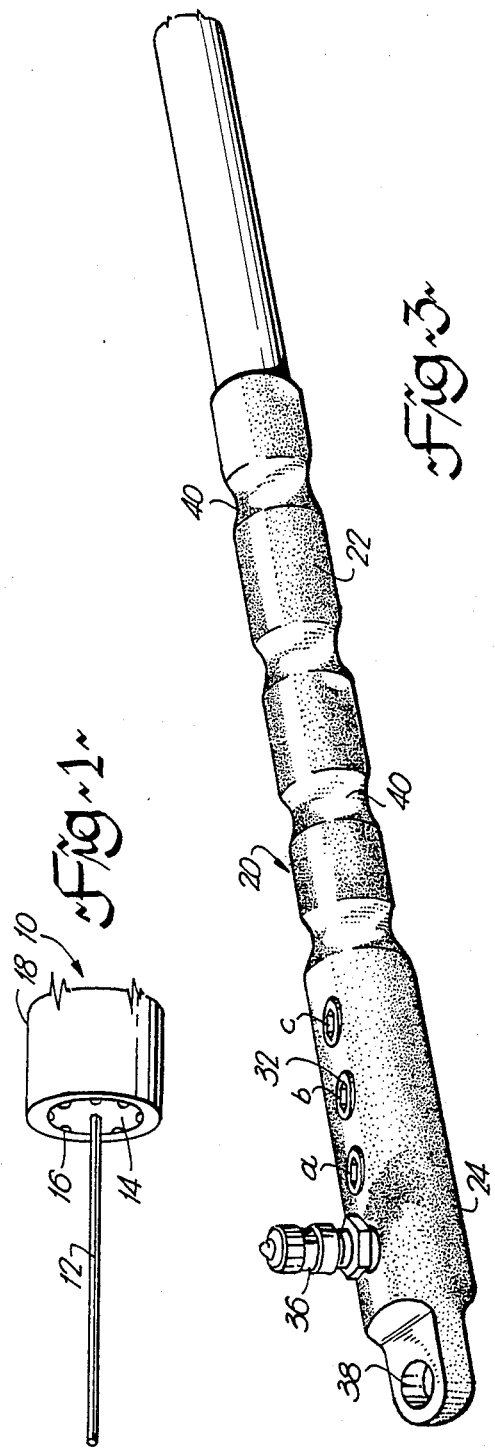
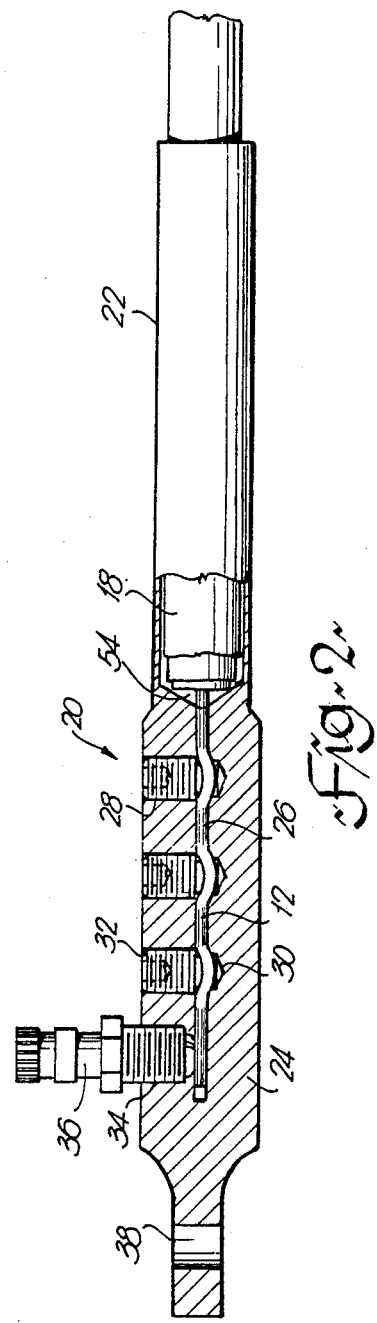

FIBRE OPTICAL CABLE PULLING EYE

FIELD OF THE INVENTION

This invention relates to a device for attachment to and for pulling a fibre optic electrical cable in conduits, plastic duct systems in underground or overhead installations and the like.

BACKGROUND OF THE INVENTION

Cable connecting devices are generally well known but the devices of the prior art do not provide suitable means for securing and pulling delicate fibre optic cable. The closest example of the prior art may be found in my earlier pulling eye assembly, the subject of U.S. Pat. No. 3,989,400 which issued July 30, 1976. That Patent describes a pulling eye assembly which is attached to a terminal end of a communication cable and the assembly uses an elongated metal sleeve which receives the communication cable and is crimped around it. The assembly includes a central block member with a barbed spigot coaxially positioned in the tubular end, this spigot being driven down into the center of the communication cable and the outer sleeve is then crimped around the cable intermediate the barbs.

The purpose of the present invention is to provide an advanced system for pulling fibre optic cable in telephone trunking, long haul transmission and the like. The present invention provides improvements over my earlier U.S. Pat. No. 3,989,400 and the purpose of the present invention is to provide a pulling means which on the one hand will not damage the delicate fiberglas strands which are positioned in the plastic sheathed fibre optic cable while on the other hand providing means that will give a load potential of the pulling eye that exceeds the tensile strength of the steel strength members positioned centrally in the fibre optic cable. The pulling device is designed to pull directly on the center strength steel or fibre member without destroying or breaking the fiberglas strands and holding a pressure seal at the same time. Tests of the present invention have shown that the locking of the pulling device onto the strength member of the fibre optic cable exceeds the steel breaking strength thereof. This allows the pulling of much longer lengths of cable than that attempted by other known means or methods.

There are of course fewer splices required when the present invention is used and field costs for pulling and splicing cable are therefore substantially reduced. It follows also that the number of planned field engineered splices and manholes in underground systems can eventually be reduced.

The pulling eye of the present invention can be easily installed by a workman in the field or installed at a cable factory. Fibre optic cable offers major advantages over coaxial cable such as imperviousness to interference, lower weight, smaller dimensions and fewer intermediate regenerators for equal transmission capacity.

The pulling device is designed to be adapted to the terminal end of fibre optic communication cable and includes an elongated metal sleeve or plastic sleeve open at one end to receive the cable. The steel or plastic sleeve is welded or otherwise secured to the head portion of the pulling device or it can also be sealed by a shrink method using a plastic or fibre material.

SUMMARY OF THE INVENTION

According to a broad aspect, a device for pulling fibre optic cable of the type having a central strength member comprises an elongated body having a tubular sleeve at one end for receiving one end of the cable and adapted for crimping around the cable. The device includes a head portion in alignment with and secured to the sleeve, the head portion having means for receiving the central strength member of the cable which extends beyond the terminal end of the cable, and for locking the central strength member to the head portion.

BRIEF DESCRIPTION OF THE DRAWINGS

The invention is illustrated by way of example in the accompanying drawings in which:

FIG. 1 is a perspective, fragmentary view of one end of a fibre optic cable;

FIG. 2 is an elevation view, partly in section, showing the cable secured into the pulling device;

FIG. 3 is a perspective view of the pulling device of FIG. 2 in final form; and

DESCRIPTION OF THE PREFERRED EMBODIMENT

Figure 5:
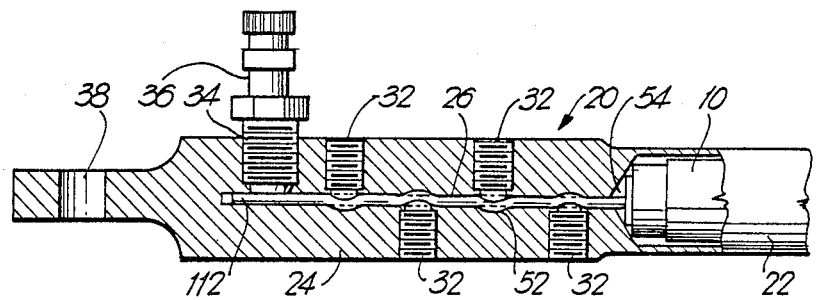
FIGS. 4, 5 and 6 are additional elevation views, partly in section, showing other methods of securing the cable to the pulling device.

Referring to FIG. 1, there is shown a portion of fibre optic cable 10 having a central strength member of steel 12 surrounded by a first insulative layer 14 in which a plurality of fibre optic strands 16 are positioned. Finally, an outer sheath 18 finishes the outer surface of the cable.

FIG. 2 illustrates the preferred embodiment of the pulling device which includes an elongated body 20 having at one end a tubular sleeve 22 and at the other end, and in alignment with the sleeve, a head portion 24. As seen in FIG. 2, the sleeve end receives the terminal end of the cable and the head portion receives the central strength member. In order to accommodate the strength member, the head portion 24 is provided with a central, elongated cavity 26 which is intersected at at least two spaced locations by elongated, threaded apertures 28 having lower sockets 30 extending below or beyond the cavity 26. Each threaded aperture 28 which lies at right angles to the cavity 26 is provided with a set screw 32. The head portion 24 is also provided with a further threaded aperture 34 for the reception of a pressurization valve 36 and the terminal end of the head 24 is machined to form a pulling eye 38.

As shown in FIG. 2, the method of connecting the cable 10 to the pulling device 20 consists of removing the outer sheath 18 of the cable 10 to a length of about four inches to expose the central steel member 12. The member 12 is then inserted into the elongated central cavity 26 of the head portion 24 and the terminal end of the cable 10 with the sheath and insulation thereon follows into the tubular end 22 of the device 20. As illustrated in FIG. 2, the set screws 32 are screwed down into the apertures 28 so that their ends deform the portion of the steel strength member 12 lying thereunder, this portion of the strength member 12 being deformed and driven into the sockets 30. This method of holding the strength member 12 is stronger than the known breaking strength of the cable. Referring to FIG. 3, the tubular sleeve 22 is then crimped at a plurality of locations 40 which pressure seals the tube to the cable 10. If a steel tube 22 is replaced by means of a plastic tube the sealing between the tube and the cable is made by a suitable sealing compound between the outer jacket of the cable and the inner diameter of the plastic tube.

The crimps 40 which effectively seal the end of the cable does provide some small advantage to linear loads but the load is mainly dependent on the pulling of the steel strength member 12 through the locking thereof to the head member 24 and the pulling of the head member 24 through the eye 38.

The pressurization valve 36 is then used to pressurize the head of the cable. While the set screws 32 can be set in any order, it is preferred that thread sealant be applied to each of the set screws and, when three are used, screw c should be tightened first, then screw b and lastly screw a as illustrated in FIG. 3.

Figure 4:
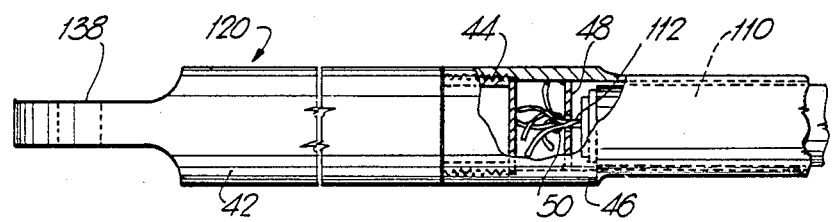

In the embodiment shown in FIG. 4, the body 120 of the device consists of a head portion 42 threadably connected at 44 to a tubular section 46. A blind end cap or disc 48 is drilled to accommodate the diameter of the central strength member 112 and, after the member 112 passes through the end cap 48, it is splayed and a steel coupling or ball 50 is welded to it. As shown in FIG. 4, this prevents the strength member 112 from pulling through the disc 48 and pull applied to the eye 138 of the body 120 is transmitted to the central strength member.

Figure 6:
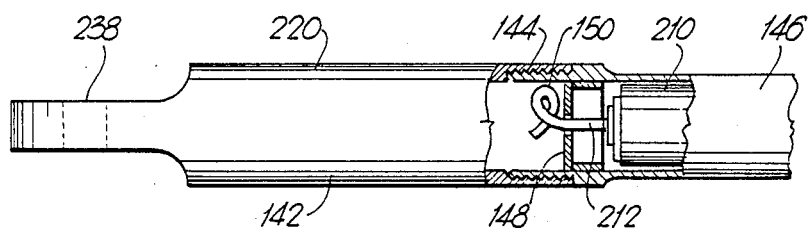

In a further embodiment shown in FIG. 6, the body 220 has a head portion 142 threadably engaged at 144 to a tubular end 146 which receives the end of the cable 210. The central strength member 212 is passed through an aperture in an end cap 148 and a knot 150 is applied to the end of the strength member to prevent it from being pulled through the end cap.

In FIG. 5, an arrangement similar to FIG. 2 is illustrated, the difference being that four set screws 32 are used, two engaging the strength member 112 in the opposite direction to another two set screws so that the strength member 112 is crimped as at 52 in two directions to increase the resistance to pull.

In the embodiments of FIGS. 4 and 6, the cable can be crimped onto the sleeve or it can be sealed by means of a suitable compound to prevent the interior of the cable from leaking around the tube.

In FIGS. 2 and 5 the steel or plastic pulling head is pressurized by the valve 36, this pressurized air being fed down the same central cavity 26 in which the pulling strength member 12 is positioned. When the set screws are rotated, the set screw c which is closest to the tube is locked first allowing the steel member 12 to be drawn back from its terminal end due to the crimping action of the set screws. Likewise, the second set screw b is rotated and locked in place and finally the third set screw a. This allows no tension on the steel strength member 12 as locking takes place. It will also be seen from FIGS. 2 and 5 that the tube end of the head portion 24 is provided with a tapered inlet 54 to the cavity 26 to facilitate easier installation of the strength member 12. The port 34 for the pressure valve 36 also acts as an inspection port, allowing the installer to see the strength member 12 before locking down the set screws 32.

With further reference to FIGS. 2 and 5, the pressure valve 36 may also be located with advantage closer to the cable than the pulling eye end of the assembly so that the valve 36 in effect would switch locations with the first set screw 32 adjacent the cable end in the embodiment of FIG. 5 or the first set screw 32 adjacent the cable end in FIG. 2. The advantage of placing the pressure valve between the set screws and the end of the cable is that, if excessive sealant is used on the set screws, the sealant could plug the drill center bore and not allow pressure to flow to the fibre optic cable. By placing the pressure valve closer to the cable end, this would not restrict the flow of gas or air by any means or inspection by the installer of the center member.

While the invention has been described in connection with a specific embodiment thereof and in a specific use, various modifications thereof will occur to those skilled in the art without departing from the spirit and scope of the invention as set forth in the appended claims.

The terms and expressions which have been employed in this specification are used as terms of description and not of limitation, and there is no intention in the use of such terms and expressions to exclude any equivalents of the features shown and described or portions thereof, but it is recognized that various modifications are possible within the scope of the invention claimed.

I claim:

1. A device for pulling fibre optic cable of the type having a central strength member, comprising an elongated body having a tubular sleeve at one end for receiving one end of the cable and adapted for circumferentially crimping around the cable at a series of spaced locations along the length of the sleeve; and an integrally formed head portion in alignment with the sleeve, said head portion having a central bore substantially the length of the head for receiving the central strength member of the cable beyond the terminal end of the cable, and means for locking the central strength member to the head portion, comprising at least a pair of spaced locking screws positioned at right angles to the central bore and engaging the strength member to crimp it into sockets aligned with the ends of the locking screws; a pressurization valve in the head portion for pressurizing the connection between the cable and the pulling device; and a pulling eye at the terminal end of the head portion beyond the locking means; the crimping of the tubular sleeve around the cable serving to transmit pull to to the cable from the pulling eye in combination with direct pull applied to the central strength.

* * * * *